United States Patent [19]

Jouade

[11] Patent Number: 4,770,396
[45] Date of Patent: Sep. 13, 1988

[54] HYDRAULIC ANTIVIBRATORY SUPPORTS

[75] Inventor: Pierre Jouade, Chateaudun, France

[73] Assignee: Hutchinson, France

[21] Appl. No.: 829,308

[22] Filed: Feb. 14, 1986

[30] Foreign Application Priority Data

Feb. 15, 1985 [FR] France ................................ 85 02217

[51] Int. Cl.⁴ ..................... F16F 15/04; F16M 5/00; F16M 13/00
[52] U.S. Cl. ................................ 267/140.1; 248/562; 267/219
[58] Field of Search .............. 267/8 R, 35, 113, 140.1, 267/140, 292, 217, 219, 220; 180/300, 312; 248/562, 636, 638; 123/192 R

[56] References Cited

U.S. PATENT DOCUMENTS 4,424,960 1/1984 Dan et al. .................... 267/140.1 X
4,610,438 9/1986 Eberhard et al. ............ 267/140.1 X

FOREIGN PATENT DOCUMENTS 3401662 7/1985 Fed. Rep. of Germany ... 267/140.1
2524951 10/1983 France ............................ 267/140.1
2558229 7/1985 France ............................ 267/140.1
0066539 6/1981 Japan ............................... 267/140.1
0098237 6/1985 Japan ............................... 267/140.1
2033534 5/1980 United Kingdom ............ 267/140.1
2068079 8/1981 United Kingdom ............ 267/140.1

Primary Examiner—Andres Kashnikow
Assistant Examiner—Robert J. Oberleitner
Attorney, Agent, or Firm—Larson and Taylor

[57] ABSTRACT

The invention relates to an antivibratory support to be fitted between the chassis and the engine of a vehicle, which support comprises two deformable chambers filled with liquid (12) and communicating with each other through a constricted passage (11), namely a work chamber (A) defined by a bowl (1) connected to the chassis, by a thick resilient ring (7), by an internal bell (8) connected to the engine and plunging into the bowl and by a dividing wall (10) closing this bell, and a compensation chamber (B) defined by the dividing wall and by a bellows (9) inside the bell. The bowl comprises a re-entrant flange (3) and the bell a peripheral bead (8₁) covered with an annular rubber shoe (13), which cannot pass through the opening defined by said flange.

3 Claims, 1 Drawing Sheet

U.S. Patent
Sep. 13, 1988
4,770,396
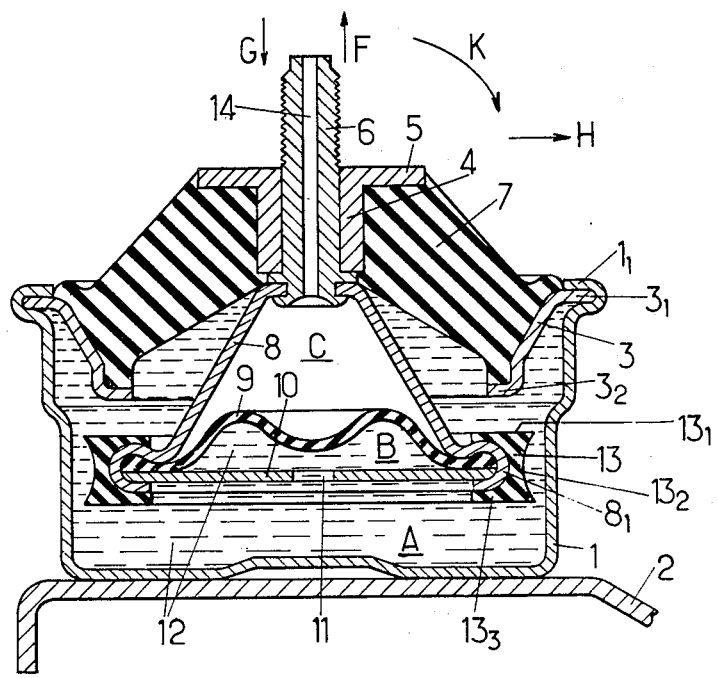

HYDRAULIC ANTIVIBRATORY SUPPORTS

FIELD OF THE INVENTION

The invention relates to antivibratory devices inserted for support and damping purposes between two rigid elements individually subjected to certain oscillations and/or vibrations, the damping being provided by a liquid driven through a restricted passage.

BACKGROUND OF THE INVENTION

By way of example, such supports may be mounted between a vehicle chassis and the engine of this vehicle for damping not only the oscillations of the chassis caused by unevenness and variations of slope of the ground over which the vehicle is travelling but also the vibrations due to engine operation.

SUMMARY OF THE INVENTION

The invention relates more particularly, among the supports of the kind in question, to those which are formed by a sealed case interposed between the two rigid elements, which case comprises a rigid bowl which may be fixed to one of the two rigid elements, a rigid bell which may be fixed to the other rigid element, this bell being smaller than the bowl and plunging therein, a thick resilient support ring joining together the bowl and the bell, a flexible membrane disposed inside the bell and sealingly connected to the edge of this bell, a fluid-tight wall carried by said edge and dividing the inside of the case into two chambers, namely a work chamber external to the bell and defined by the bowl, the ring, the bell and the dividing wall, and a compensation chamber inside the bell and defined by the membrane and the dividing wall, these two chambers communicating permanently with each other through the above restricted passage, which is preferably formed by a hole in the dividing wall, and a liquid mass filling the two chambers as well as the restricted passage.

With such a support, the oscillations or vibrations created between the two rigid elements result in causing these two elements to draw close to and away from each other axially in turn and the liquid to be driven from one of the two chambers into the other through the restricted passage and conversely, which provides hydraulic damping of this liquid because of its constriction in said passage.

With present embodiments of supports of the kind in question, resistance to axial tearing away of the bell from the bowl and to the relative transverse movements between these two parts is exclusively provided by the resilient ring.

It may therefore happen that certain abnormally high forces exerted on the mass supported (engine or similar), such as those due to sudden decelerations, result in excessive deformation of said ring which may lead to breaking thereof and generate shocks resulting in damage between said supported mass and the vehicle body.

The aim of the invention is more especially to overcome such a disadvantage by limiting the deformations in question by abutment.

For this, the supports of the above kind are essentially characterized in accordance with the invention in that the edge of the bowl is extended by a rigid flange directed inwardly of this bowl and in that the edge of the bell itself ends in an external bead portion of such a size that it cannot pass through the opening defined by said flange In preferred embodiments, recourse is further had to one and/or other of the following arrangements:

the support is of revolution about an axis and the external diameter of the bead portion is greater than the inner diameter of the re-entrant flange, the bead portion is formed at least externally by a rubber or similar shoe, the above shoe defines with the wall of the bowl which surrounds it at least one restricted annular passage, the thick ring has the general form of a truncated cone, the re-entrant flange is formed by a metal washer of a general truncated cone shape directed inwardly into the bowl and fixed thereto, particularly by crimping, and the large base of the thick ring is adhered to this washer, the thick ring has a general truncated cone shape, the top of the bell is fixed to the base of a rigid cylindrical stud and the small base of the ring is adhered against the lateral wall of this stud.

Apart from these main arrangements the invertion comprises certain other arrangements which are preferably used at the same time and which will be more explicitly discussed hereafter.

In what follows, a preferred embodiment of the invention will be described with reference to the acccmpanying drawings in a way which is of course in no wise limitative.

BRIEF DESCRIPTION OF THE DRAWINGS

The single FIGURE of these drawings shows in axial section an antivibratory support constructed in accordance with the invention.

DETAILED DESCRIPTION OF THE PREFERRED EMBODIMENT

Said support is intended to be fitted vertically between a rigid carrier member formed by a vehicle chassis and a rigid supported member formed by an internal-combustion engine. The terms "high, low, upper, lower, bowl, bell" used in the description which follows are given solely by way of non limitative example for the support described may be perfectly well used in a direction the reverse of that adopted for this description.

The support considered has the general form of a sealed case comprising:

a lower rigid bowl 1 fixed, more particularly by welding, to a bracket 2 easily mountable on the chassis of the vehicle, a rigid metal washer 3 of a general truncated cone shape plunging inside the bowl 1 from its peripheral edge $3_1$, which is crimped to the upper edge $1_1$ of this bowl, a rigid cylindrical stud 4 extended radially at its upper end by a support disk 5, the assembly of these two elements 4 and 5 having passing therethrough the lower portion of a threaded stud bolt 6 whose upper portion serves for fixing the engine to be supported, a resilient ring 7 sufficiently thick for transferring the loads from the supported member to the supporting member without collapsing, which ring is defined by two truncated cone shaped surfaces opening out downwardly and the smaller base of which is adhered both against the cylindrical side face of stud 4 and against the lower flat face of disk 5, its large lower base being adhered to the washer 3, a bell 8 defined by a truncated cone shaped skirt opening downwardly, which bell is fixed at its top by crimping to the lower end of the stud bolt 6, a bellows 9 which is fluid tight and flexible, more especially elastically, disposed inside the bell 8 and whose periphery is sealingly fixed to the edge of this bell, and a dividing wall 10 closing said bell and the periphery of which is also sealingly fixed to the edge of this bell, said dividing wall dividing the inside of the case into two chambers, namely a work chamber A external to the bell and a compensation chamber B thereinside.

A constricted passage 11 causes the two chambers A and B to be permanently in communication with each other and a liquid mass 12 fills these two chambers A and B as well as this passage 11.

In the illustrated embodiment, the constricted passage 11 is formed by a hole in the center of the dividing wall 10, which is rigid.

This dividing wall 10 could also be movable or deformable vertically then associated with means for limiting the vertical movements, means such as external stops or an internal inextensible frame.

As for the constricted passage 11, it could also be formed by a relatively long channel extending for example along an arc of a circle inside an annular body forming the base of bell 8 and the two ends of which open respectively into the two chambers A and B.

The bellows 9 and the dividing wall 10 are sealingly fixed to bell 8 advantageously by crimping, the lower edge $8_1$ of the bell extending first of all radially outwardly before being bent downwards and inwards so as to envelop and grip round the superimposed edges of these two elements.

The annular bead formed by edge $8_1$ thus bent back is itself jointingly covered by an annular pad 13 made from rubber or another resilient material.

This pad 13 is formed with an annular groove having in cross section the form of a U open towards the axis of the support and thus covers not only the outer face of bead $8_1$, but also its upper face and its lower face: thus it forms an annular "shoe" for the bead $8_1$, able to accomodate the contacts established between this bead $8_1$ and the opposite surfaces and this in all directions, as will be discussed further on.

As can be seen in the drawings, face $13_1$ of this shoe is below the lower edge $3_2$ of washer 3, which edge is bent horizontally towards the axis of the support so as to form a contact surface of sufficient area for said face $13_1$.

The outer face $13_2$ of shoe 13 is disposed radially opposite the cylindrical wall of bowl 1, at a short distance from this wall.

The annular space between these two facing surfaces may form at least one constriction for the passage of the liquid flowing between the two top and bottom portions of chamber A.

It may be advantageous to adjust the dimensions of this constriction depending on the damping means: thus, in the embodiment illustrated, the axial half section of shoe 13 has externally two horns which define two such constrictions in series.

Although it is not indispensable, chamber C which is inside bell 8 above the bellows 9, which chamber is normally full of air, is advantageously vented through a duct 14 formed axially through the stud bolt 6.

The assembly of the above described elements—except for (2)—are preferably of revolution about an axis, called "support axis". But general sectionshapes other than circular could also be used, for example an oval or square shape.

The operation of the above described support is as follows.

During relative movements between the carrier assembly formed by the chassis and the elements (1, 2) which are fixed thereto and the supported assembly formed by the engine and the elements (4-6) which are fixed thereto, the first assembly moves periodically towards and away from the second along the vertical.

Each time the two assemblies move closer together, a fraction of the liquid contained in chamber A is driven by deformation of ring 7, to chamber B through the passage 11, which causes the bellows 9 to extend upwardly; the reverse happens during a consecutive moving away of the assemblies.

In the case of an abnormally high upward force exerted by the engine (shown by arrow F) the ring 7 is deformed under flexion and traction until the surface $13_1$ of shoe 13 comes into axial abutment against the flange $3_2$ of the washer.

This abutment occurs first of all progressively because of the compressibility of shoe 13, then it completely interrupts deformation of ring 7 and prevents breakage thereof as well as the destruction of the support.

On the contrary, in the case of high downward force exerted by the engine (shown by arrow G), ring 7 begins by being deformed under flexion and compression until the base $13_3$ of shoe 13 comes into axial abutment against the bottom of the bowl 1: the deformation in question can no longer be continued beyond such abutment.

Finally, in the case of a lateral horizontal force (shown by arrow H) or a rocking force (shown by arrow K), it is the peripheral edge $13_2$ of shoe 13 which comes progressively into abutment against the portion transversely opposite of the cylindrical wall of the bowl 1, then prevents any further deformation of ring 7 and so tearing away or breakage thereof.

Thus, in all cases where an abnormally high force is exerted on the supported engine, for example in the case of sudden deceleration of the vehicle, a first of all progressive and finally extremely firm and reliable interruption is observed of the deformations of the support, thus preventing destruction thereof.

Following which, and whatever the embodiment adopted, a support is finally obtained whose construction and operation are sufficiently clear from the foregoing.

This support has, with respect to those known in the prior art, the important advantage of providing a very solid anchorage of the first rigid element on the second, that is to say, in the application cited by way of example, of the engine on the chassis of the vehicle, considering the limitation by resilient abutment which is imposed, in such a support, on the deformations thereof during the action of abnormally high forces on the supported mass.

As is evident, and as it follows moreover from what has gone before, the invention is in no wise limited to those of its modes of application and embodiments which have been more especially considered; it embraces, on the contrary, all variants thereof, particularly:

those in which the cushions made from rubber or from another resilient material for absorbing the shocks between the bead $8_1$ formed at the base of bell 8 and the opposite surfaces are provided on some at least of these surfaces instead of being provided on this bead, or to supplement those provided on this bead, those where said cushions, while remaining of revolution about the axis of the support, have a variable and non constant thickness over the whole of their extent so as to obtain different tear resistances in different directions, those where, for the same reason, the distances between the respective surfaces of the bell and the bowl intended to come into mutual contact should extreme forces be exerted are variable about the axis of the support, those where the skirt of bell 8, instead of being in the shape of a truncated cone, has at least partially a cylindrical shape so that the volume of the compensation chamber B defined by the bellows 9 itself housed in this bell, may be greater.

I claim:

1. An antivibratory device intended to be fitted for support and damping purposes between two rigid elements, formed by a fluid tight case inserted between the two rigid elements, which case comprises a rigid bowl securable to one of the two rigid elements, a rigid bell securable to the other rigid element, said bell being smaller than the bowl and extending into the bowl, a thick resilient support ring connecting the bowl to the bell, a flexible membrane disposed inside the bell and sealingly joined to the edge of this bell, a fluid-tight dividing wall carried by said edge and dividing the inside of the case into two chambers, namely, a work chamber external to the bell and defined by the bowl, the ring, the bell and the dividing wall and a compensation chamber inside the bell and defined by the membrane and the dividing wall, these two chambers communicating permanently with each other through a constricted passage, and a liquid mass filling the two chambers as well as the constricted passage, characterized in that the edge of the bowl is extended by a rigid flange re-entrant inside this bowl and in that the edge of the bell itself ends in an external bead portion which is covered by a resilient shoe portion, the diameter of the head portion being greater than the inner diameter of the re-entrant flange, such that the bead portion cannot pass through the opening defined by said flange, and wherein the shoe defines with the wall of the bowl which surrounds it at least one constricted annular passage.

2. An antivibratory support according to claim 1, wherein the thick ring is of a generally truncated cone shape, the re-entrant flange is formed as a metal washer of generally truncated cone shape, re-entering into the bowl and fixed thereto, and wherein the large base of the thick ring is adhered to this washer.

3. An antivibratory support according to claim 1, in which the thick ring is of a generally truncated cone shape, and wherein the top of the bell is fixed to the base of a rigid cylindrical stud and the small base of the thick ring is adhered to the sidewall of this stud.

* * * * *